(No Model.)

W. H. RICHTER.
FLY TRAP.

No. 580,163. Patented Apr. 6, 1897.

Witnesses

Inventor
William H. Richter,
By his Attorneys,
C. A. Snow & Co.

UNITED STATES PATENT OFFICE.

WILLIAM H. RICHTER, OF BLUE RIDGE, MISSOURI.

FLY-TRAP.

SPECIFICATION forming part of Letters Patent No. 580,163, dated April 6, 1897.

Application filed September 16, 1896. Serial No. 606,045. (No model.)

*To all whom it may concern:*

Be it known that I, WILLIAM H. RICHTER, a citizen of the United States, residing at Blue Ridge, in the county of Harrison and State of Missouri, have invented a new and useful Fly-Trap, of which the following is a specification.

The invention relates to improvements in fly-traps.

The object of the present invention is to provide a simple and comparatively inexpensive device adapted to remove flies and other insects from the backs of horses and cattle and capable of capturing and caging such insects, so that they may be easily destroyed.

The invention consists in the construction and novel combination and arrangement of parts hereinafter fully described, illustrated in the accompanying drawings, and pointed out in the claim hereto appended.

Figure 1:
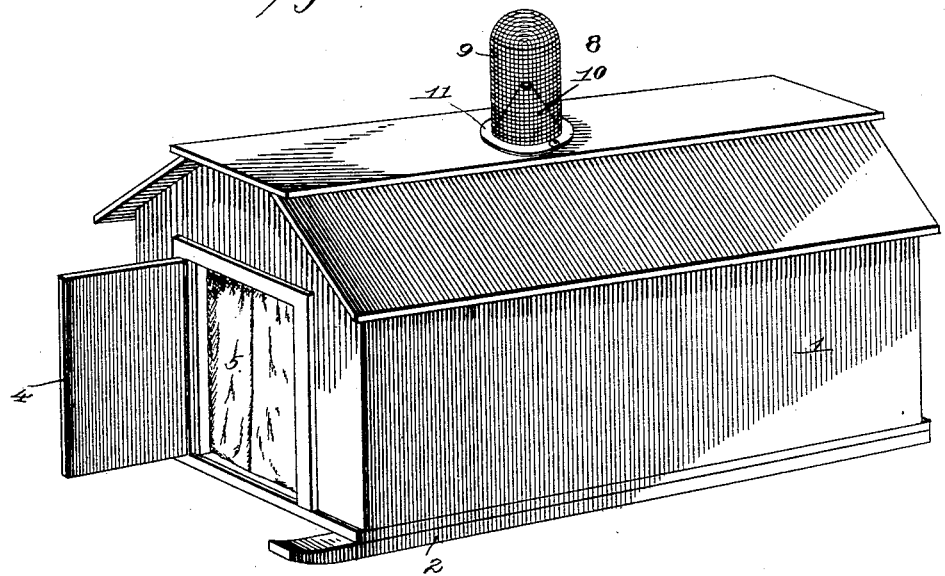
Figures 2, 3:
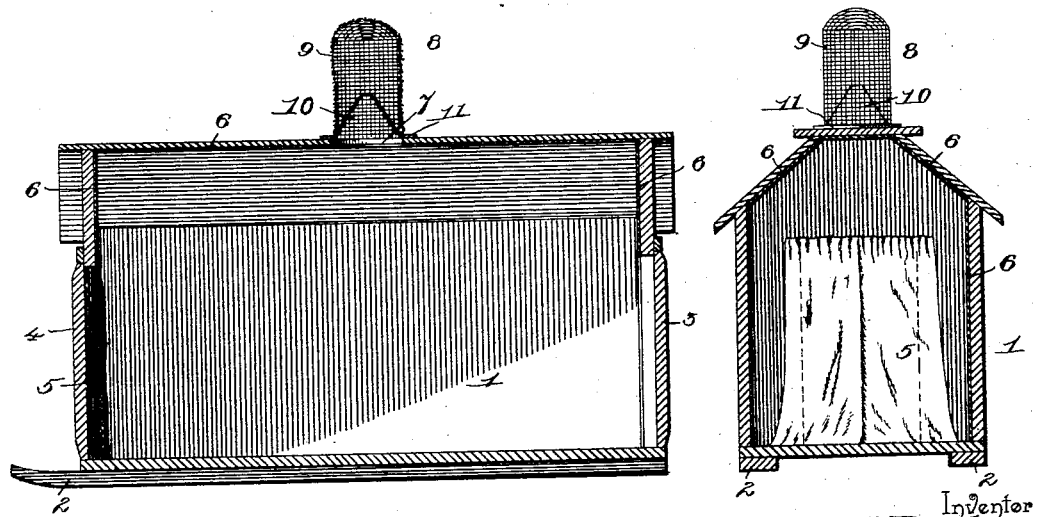

In the drawings, Figure 1 is a perspective view of a fly-trap constructed in accordance with this invention. Fig. 2 is a longitudinal sectional view. Fig. 3 is a transverse sectional view.

Like numerals of reference designate corresponding parts in all the figures of the drawings.

1 designates a frame or body forming a shed and consisting of side and end walls, a bottom or floor, and a roof. The shed, which may be of any desired dimensions, is mounted on runners 2 to render it portable to enable it to be readily conveyed from one pasture to another as the stock are changed. It is provided at its ends with doors 3 and 4, forming an entrance and an exit, and in the operation of the device the horses or cattle or other animals from which the flies and other insects are to be removed are driven through the shed and pass from one end of the same to the other.

The animals enter at the door 3 and leave by the door 4, and curtains 5, which are arranged within the shed, are hung adjacent to the door 4 and are adapted to scrape flies and other insects from the animals as they pass between them. The curtains, which may be hung in any suitable manner at the inner side of the door, are preferably dipped in coal-tar to prevent the cattle from eating them, and, if desired, the curtains may be duplicated, or a series of curtains may be placed adjacent to the door 4. The curtains 5 (shown in the accompanying drawings) consist of two portions or curtains arranged opposite each other, so as to engage both sides of an animal, and they are preferably made sufficiently full to enable an animal to pass easily through them and at the same time to brush it thoroughly.

As soon as the animals have passed through the shed the doors 3 and 4 are closed to darken the interior of the shed, and the inner faces of the walls and roof of the latter are preferably covered with sheets 6 of tar-paper or similar material, whereby light is effectually excluded and the interior thoroughly darkened.

The roof, which is oppositely slanted, is provided with a central horizontal portion and has a central opening 7, over which is mounted a trap 8, consisting of a cylindrical cage 9 and a cone 10, arranged within the lower end of the cage, forming a paper bottom for the same and provided at its apex with an opening. The cage and the cone are constructed of wire-gauze or similar material suitably strengthened, and the light readily passes through the trap and attracts the insects to it. The insects pass upward in the cone and enter the cage through the opening at the apex of said cone. After the insects have entered the cage they will not escape through the entrance-opening.

The trap is provided at its base with a flange 11 and is detachably secured to the roof by screws or other suitable fastening devices in order that it may be readily removed for destroying the insects.

Any suitable means may be provided for enabling the insects, after they have been destroyed, to be removed from the cage.

It will be seen that the fly-trap is simple and comparatively inexpensive in construction, that it is positive and reliable in operation, and that it effectually removes flies and other insects from horses and cattle and enables such insects to be readily captured and destroyed.

Having described my invention, what I claim is—

A device of the class described comprising a portable shed provided with runners and having entrance and exit doors 3 and 4, said shed being composed of straight sides and ends and having an oppositely-slanted roof with a central horizontal ridge portion, a lining or covering of dark material arranged on the inner faces of the walls and roof of the shed to assist in darkening the interior, the centrally-divided curtains 5 constructed of fabric and arranged within the shed adjacent to the exit-door to brush flies and other insects from the backs of animals, and a removable transparent trap consisting of a cylindrical cage mounted upon the horizontal portion of the roof over an opening thereof and provided with a flange 11, and a cone arranged within the lower end of the cage and provided at its top with an opening, substantially as described.

In testimony that I claim the foregoing as my own I have hereto affixed my signature in the presence of two witnesses.

WILLIAM H. RICHTER.

Witnesses:
J. W. BONSER,
A. N. CAVE.